Patented July 22, 1941

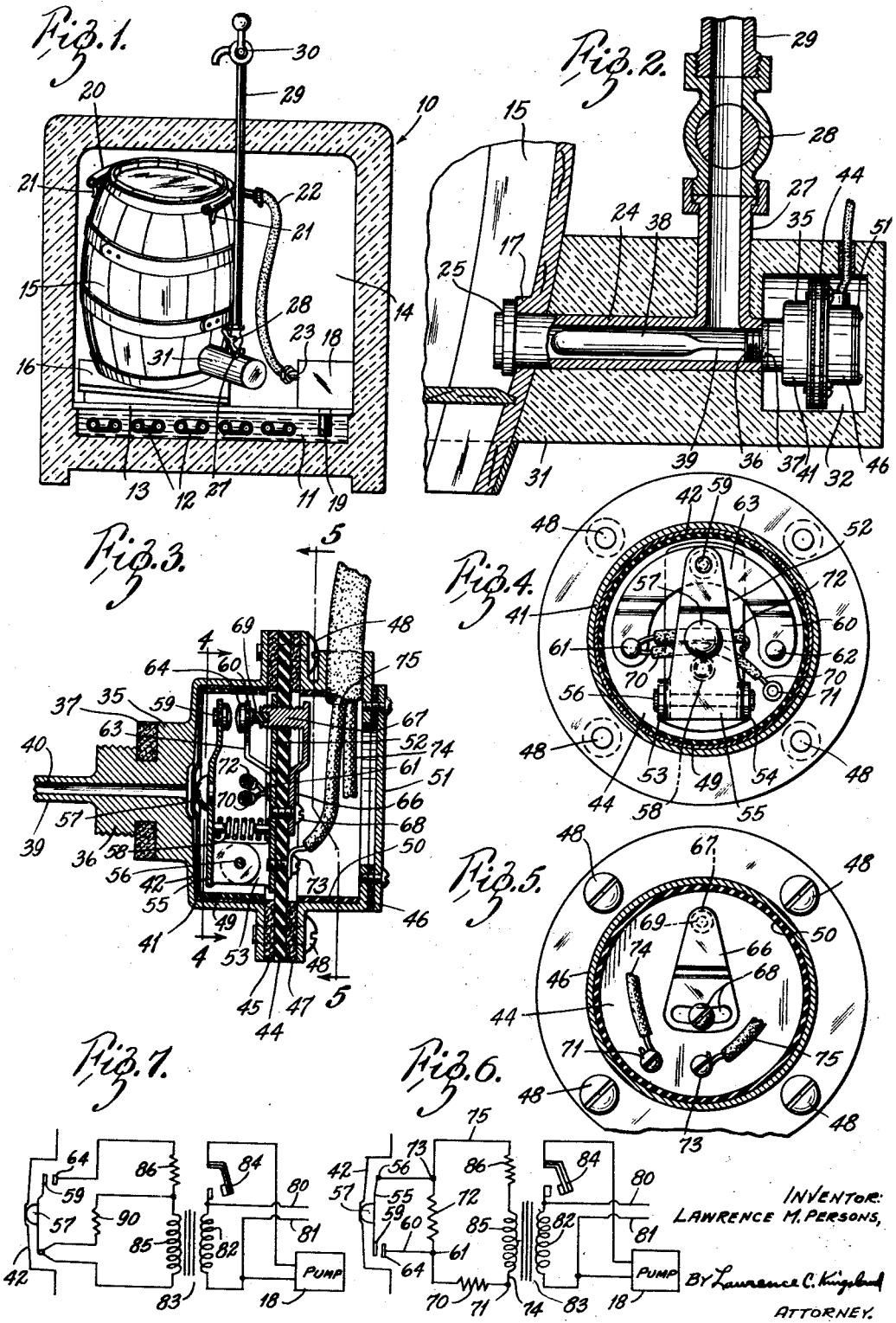

2,250,438

UNITED STATES PATENT OFFICE 2,250,438

COMPENSATOR FOR REFRIGERATION CONTROL

Lawrence M. Persons, St. Louis County, Mo., assignor to Automatic Control Corporation, St. Louis, Mo., a corporation of Delaware Application August 20, 1937, Serial No. 160,065

13 Claims. (Cl. 62—7)

The present invention relates to a thermostatic control, and it is particularly exemplified in connection with a refrigeration system.

In controls of this type, wherein a thermostat is made subject to the temperatures of a medium being cooled for the operation of the cooling unit, difficulty has been encountered in the fact that more or less necessarily the sensitive element has responded in part to temperatures external to those of the substance being cooled so as to be inaccurate.

For illustration, a beer cooling unit is shown wherein the thermal element is inserted into a pipe leading from the barrel bung. Particularly, in a case such as this, where it is impractical to insert the thermostat entirely within the container, is the difficulty present that the outside temperature acts upon the thermostat. The result is that the thermostat registers, not the temperature of the medium being cooled, but rather a resultant or average temperature developed by the temperature of the medium being cooled and the external atmosphere.

The present invention has for its object the provision of means to compensate for the effects of this external temperature to cause the thermostat to be sensitive only to the temperature of the medium being cooled.

Specifically, the invention has for an object the provision of heating means of such characteristics as to offset the cooling effect of the surrounding temperatures on a portion of the thermostat and to render the thermostat thereby operative in response to the true temperatures of the medium being cooled.

A further object of the invention is to provide a constantly operating electric heating element supplying a quantity of heat necessary to compensate for the effects of external cold upon the thermostat.

In the drawing:

Fig. 1 is a vertical section through a cabinet disclosing an application of the present invention.

Fig. 2 is a vertical section of the outlet pipe showing the control unit installed.

Fig. 3 is a vertical section through the switch portion of the control unit.

Fig. 4 is a section on the line 4—4 of Fig. 3.

Fig. 5 is a section on the line 5—5 of Fig. 3.

Fig. 6 is a wiring diagram of the circuit.

Fig. 7 is a modified type of wiring diagram.

The present unit is especially applicable to a refrigeration means, although it will be obvious that it is of more general application. For illustration, it is described in connection with a beer cooler. A suitable box is shown at 10. This box has a tank space 11 adjacent the bottom thereof adapted to be filled with a refrigerant solution, such as brine. Refrigeration coils 12 are distributed throughout this space 11 to maintain the brine at a low temperature. A shelf 13 is provided over the brine space 11 and permits air to circulate down onto the brine from the upper chamber 14 wherein the member to be cooled is located.

A beer keg 15 is shown resting on a table 16 that slopes toward the bung 17 (Fig. 2). The barrel is adapted to be cooled by the cold atmosphere in the box, and also by a spraying of the brine solution thereover. To this latter end a pump 18 is located within the container, it having a pipe 19 extending down into the brine supply. A ring 20 rests upon the top of the barrel by means of feet 21 and has spray openings around the bottom thereof. A flexible hose 22 connects the ring 20 to an outlet pipe 23 from the pump 18. Thus, upon inserting a barrel within the box, the ring may be dropped over the top thereof to rest thereon.

An outlet pipe 24 is provided to extend into and engage the usual valve 25 within the barrel. The valve is diagrammatically represented here and is of the type known as "golden gate valve". It will be understood that the outlet pipe 24 has means engaging the seal of the valve 25 to open the same when the outlet pipe is inserted into the bung and rotated.

The outlet pipe 24 has an upward extension 27 thereon extending to a cut-off valve 28 from the upper end of which extends a pipe 29. The pipe 29 passes through the top of the container and has the usual beer serving valve 30 thereon.

Thick insulation 31 surrounds the outlet pipe 24 and the control unit, as will be described. A pocket 32 is provided within the insulation to receive the control unit.

The control unit has a housing 35 with a threaded extension 36 thereon engageable into an end of the outlet pipe 24, a washer 37 being provided to insure a tight seal. A thermostat bulb 38 is provided on the end of a tube 39 which tube is secured to the projection 36 so as to be integral therewith.

The tube has a passage 40 that communicates into a cup-like end portion or extension 41 on the housing 35. A corresponding cup-like diaphragm 42 is closely fitted within the cup-like extension 41 and is sealed thereto about its lateral edges, permitting the bottom portion to flex toward and from the extending portion of the extension 41.

A switch base plate 44 extends across the open portion of the extension 41. A washer 45 is interposed between the plate 44 and the flange of the extension 41. An additional cup-like member 46 is disposed oppositely to the cup-like extension 41, and a washer 47 is located between the flange on the member 46 and the switch plate. Suitable screws 48 extend through the washers, the flanges, and the switch base to hold these several parts together. Insulating rings 49 and 50 are provided around the walls of the extension 41 and member 46, respectively. A removable cover plate 51 is attached to the member 46 to give access to its interior, particularly the adjusting means to be described.

On the switch base 44 there is mounted a conducting pivot-holding plate 52. This plate has upstanding ears 53 and 54 adjacent one end. The plate 52 extends across the base, as appears in Fig. 4.

A switch blade 55 has depending ears extending adjacent the ears 53 and 54, through all of which ears a pivot bar 56 extends. The switch blade 55 has a button 57 thereon caused to engage the center portion of the diaphragm element 42 by a spring 58, whereby to be moved upon expansion thereof. A contact 59 is provided on the outer end of the switch blade 55.

A flexible, U-shaped, relatively fixed switch plate 60 is secured at 61 and 62 to the plate 44. The central portion 63 of this switch member 60 is displaced outwardly from the switch plate, as shown in Fig. 3. It contains a contact element 64 for cooperation with the contact 59.

An adjusting strip 66 is located on the remote side of the plate 44 within the cup 46. It has a threaded extension 67 thereon passing through the plate 44 and threaded into the element 52, the degree of its projection beyond the element 52 being determined by the rotation of the screw 67. This latter is adjusted by movement of the strip 66, there being a screw and slot arrangement 68 limiting the adjustment and securing it tightly into adjusted position. A nonconducting plug 69 is provided in the projection 67 and engages the switch element 60. The normal resilience of the element 60 urges it constantly against the nonconducting element 69.

Two heating elements are provided within the extension 41. One of them, shown at 70, extends from a terminal 71 to the fastening means 61 and the other, shown at 72, is connected to the fastening means 61 and to the pivot-supporting plate 52.

A terminal 73 is provided in the plate 44 and is in electrical communication with the plate 52. A line 74 extends to the terminal 71 and the line 75 extends to the terminal 73.

The circuit connections through the switch are as follows:

When the contacts 59 and 64 are parted, the current may enter the line 74 to the terminal 71, thence pass through the heating element 70 to the terminal 61, thence through the heating element 72 to the plate 52 and through the terminal 73 to the line 75. When the diaphragm 42 is moved by expansion of the liquid in the bulb and tube passage 40 it will move the contact 59 against the contact 64. When this occurs, the heater 72 is short circuited since an easier path is established as follows: line 74, terminal 71, heater 70, terminal 61, switch element 60, contact 64, contact 59, switch blade 55, switch element 52, terminal 73 and line 75.

Preferably the thermostat is of the solid-charge type in which, when cold, the diaphragm element 42 is contiguous throughout its area to the extension 41. Upon increase of heat of the liquid, an invariable amount of movement of the diaphragm obtains for any given heat value. The movement of the diaphragm may be very small.

The operation of the system is as follows:

The beer barrel 15 is located within the container 10 at which time the control unit is disconnected from the control and from the pipe 29 at the top of the valve 28, or at any other point, if it be desired to install a separate union. The control unit is then installed with the valve 28 closed, by the expedient of inserting the extension pipe 24 into the valve 25 and rotating the same. This rotation opens the valve 25 and locks the pipe 24 into the position shown in Fig. 2 (as is familiar in this art). The beer from the barrel will then flow into the pipe 24 to the upstanding portion 27 and the valve 28. The pipe 29 may then be connected and the valve 28 opened.

In the event that the beer surrounding the bulb 38 is at a temperature above that desired and for which the thermostat is set, expansion of the liquid within the bulb will force the diaphragm 42 outwardly to close the switch. This operation will cause the pump 18 to be energized, whereupon cold brine from the section 11 will be sprayed over the barrel from the spray holes in the ring 20. When the beer is reduced to the proper temperature, the switch will open and the keg will be maintained cold because of the cold atmosphere within the container 10 produced by the bath of brine at the bottom thereof.

This brine is normally at a very low temperature, substantially below the desired temperature for the beer. Since the thermostat is located near to this brine supply, it is inaccurate since a heat transfer occurs through the insulation 31 and through the pipes 27 and 24. Consequently, even though the beer within the barrel may be at a high temperature, the thermostat bulb can be below the critical range because of the aforesaid dissipation of heat into the very cold atmosphere adjacent the brine. It is to compensate for this effect that the heaters 70 and 72 have been provided.

The connections of the pump and switch are shown in Fig. 6. Power lines are brought in, 80 and 81. The primary 82 of a transformer 83 is put across the power line. Likewise, the pump 18 is put across the power lines with the thermal switch 84 in series with it. The lines 74 and 75 are connected to opposite ends of the secondary 85 of the transformer 83, with the heating unit 86 intervening to operate the switch 84. Thus, as soon as the switch 84 closes, the pump will be energized.

When the thermostat switch is open, both the heaters 70 and 72 are connected in series. These two heaters together provide such a voltage drop that insufficient current is present to generate enough heat in the heater 86 to close the switch 84. When, however, the thermostat switch closes contact 59 against contact 64, the heater 72 is short circuited and enough current then flows to generate an amount of heat in the heater 86 adequate to cause the switch 84 to close, with the result that the pump circulates the brine over the barrel. The heater 70 is shown of a relatively low resistance and the heater 72 of a high resistance.

If it be assumed that the brine temperature is 10°, the beer temperature 50° and the desired beer temperature 40°, the temperature then at the bulb 38 will be at some intermediate point, such as approximately 25°. Since this temperature is below the operating temperature of the thermostat, the latter switch will not be closed despite the fact that the beer is above the desired temperature, except for the provision of the compensating heaters. Wherefore, the heaters are designed always to provide a certain added amount of heat sufficient to bring the thermostat up to the desired critical temperature. Thus, with the surrounding temperature 25° and the desired critical temperature 40°, the heaters will provide a temperature sufficient to supply the needed 15° in the thermostat. The thermostat will then be operated by the average or the resultant temperature between the actual beer temperature and the critical temperature which, in the illustration given, would be 45°. So long as the beer is above its desired temperature, this resultant temperature will likewise be above the given amount.

Further, the heaters are so designed that when the full secondary potential is applied to both of them, the same amount of heat will be generated in the two because of the relatively low current, as is generated in the single heater 70 when the secondary potential is applied only to it, in view of the higher current then flowing through the single heater. Preferably, the heater 70 is of relatively low resistance and the heater 72 of relatively high resistance, whereby a relatively high current flowing through the heater 70 will produce an amount of heat equal to that produced by the lower current through both resistances.

To illustrate relative values, it may be assumed that the heat relay 86 requires a certain current for its operation. It may also be assumed that with both heaters 70 and 72 in series the heat produced may be one-half of this value for operation of the heat relay. Under such circumstances, and neglecting changes in the resistances upon heat changes which follow known electrical formulae, the heater 70 may have a relative value of 2 ohms, the heater 72 may have a relative value of 6 ohms, and the heater 86 may have a relative value of 4 ohms. These relative values, of course, are subject to change with variations in the original assumptions.

It is seen that the system of Fig. 6 requires only two wires into the thermostat. Where it is possible to use three wires into the thermostat, one of the heaters may be dispensed with. Such a hookup is shown in Fig. 7. In this case, a single heater 90 is provided constantly across the secondary of the transformer. The thermostat switch and the relay heater 86 are in parallel with the heater 90 so that the relay heater is in circuit and energized only when the thermostat switch closes.

What is claimed is:

1. In a cooling system, a container of liquid to be cooled, a conduit for withdrawing the liquid, a heat change unit to produce heat changes in the liquid, a thermostat for controlling the unit, a thermal element for said thermostat and located in said conduit, whereby to be affected by temperature of the liquid and extraneous temperatures, and means changing the heat condition of the element to compensate for the extraneous temperatures.

2. In a cooling system, a container for liquid to be cooled, an outlet pipe connected to the container, a refrigeration unit to supply a heat absorptive medium to the outside of the container, a thermostat including a thermal element for controlling said unit, the thermal element being located in said outlet pipe, and subject to the temperatures of the liquid in the pipe and of the heat absorptive medium, a heater element adjacent said thermal element, and said heater element being adapted to supply an amount of heat to the thermal element substantially equal to the heat withdrawn therefrom by the absorptive medium, whereby to render the thermal element operable by the temperatures of the liquid.

3. In a cooling system, a box, a liquid container in the box, a supply of refrigeration liquid in the box to cool the contents of the container, an outlet for the container in heat conducting relationship to said refrigeration liquid, a cooling unit in the box, a thermostat for controlling said unit, and including a thermal element in said outlet, subject to the temperatures of the liquid in the container and the refrigeration liquid, and a heater adjacent said element adapted to compensate for the effects of the refrigeration unit on the element.

4. In a system of the kind described, a container, an outlet for the container, an outlet pipe leading from the container, a thermostat bulb in and projecting through the outlet, insulation surrounding the outlet, a pocket in the insulation adjacent the bulb projection, and heating means in said pocket.

5. In a cooling system, power lines, a cooling means, a thermostat to control the same and a switch, a pair of compensating heaters adjacent the thermostat, one being a high resistance heater and the other low, means to cause the cooling means to be energized including a control element; said low resistance heater, the switch, and the control element being in series across the power lines, and the high resistance heater being connected across the lines to be in parallel with the switch.

6. In a cooling system, power lines, a cooling means, a thermostat to control the same including a thermal element and a switch, a pair of compensating heaters adjacent the thermal element, one being a high resistance heater and the other low, a relay to put the cooling means in operation, said relay, switch, and low resistance heater being in series across the power lines, and said high resistance heater connected from the outer side of the low resistance heater to the inner side of the switch, whereby when the switch is open, both heaters with the relay are in series across the lines, and whereby the switch, when closed, short circuits the high resistance heater.

7. In a cooling system power lines, a transformer, a cooling means including an electrically operated device, a heat relay having a heat responsive element actuating a switch in series with the said device, the series being across the power lines on the primary side, a switch and a thermostat to actuate the same, two compensating heaters adjacent said thermostat, a heater for actuating the heat relay, one of said compensating heaters, the switch, and the heat relay heater being connected in series across the transformer secondary, and the other compensating heater being connected across the switch to be short circuited when the switch is closed by the thermostat, the resistance of both compensating heaters being high enough to prevent heating of the relay heater to actuate its heat responsive element, and the resistance of the compensating heater in series with the switch, when the switch is closed, being such as to supply substantially the same amount of heat as both do in series, but offering insufficient resistance to prevent operation of the heat relay.

8. In a thermostatic switch mechanism, a cup-like member, a tube extending from the member and communicating with the interior thereof, a bulb on the tube, means attaching the member to a unit to be controlled, a flexible cup-like diaphragm closely interfitted within the cup-like member and normally contiguous thereto throughout its area, liquid completely filling the bulb, tube, and any space between the member and diaphragm, said liquid being adapted, upon expansion, to move the diaphragm away from the end wall of the member, a plate over the open end of the member, a switch on the plate and within the cup-like member and diaphragm, said switch including a pivoted blade, a spring urging the blade against the diaphragm, a heater unit adjacent the diaphragm, said heater being in parallel with the switch, an adjustable contact cooperable with the switch blade, means on the outer side of the plate and extending through the same to adjust the adjustable contact relative to the blade, and a cover for said adjustment.

9. In a thermostatic switch mechanism, a cup-like member having a bottom and an open end, a diaphragm within the member extending across the bottom thereof, and adapted to flex away therefrom, the diaphragm and bottom forming an expansion chamber, a tube extending into said chamber through the cup-like member, a plate across the open end of the member and enclosing a space within the cup, a switch mounted on the plate within the space, said switch being adapted to be actuated by the diaphragm, and means for adjusting the relationship between the switch and the diaphragm to vary operation of the switch.

10. In a control of the kind described, a thermal unit, a load adapted to operate at a predetermined minimum current value to produce a given effect, a pair of heaters, means connecting the two heaters and the load in series, means operated by the thermal unit to shunt one heater, the relative resistances of the two heaters and load being such that with them in series as aforesaid they do not admit enough current to operate the load to produce said effect, but said heaters jointly provide a predetermined amount of heat, and when the one heater is shunted out, the other passes enough current to operate the load to produce said effect, and with such increased current, provides substantially the same amount of heat.

11. In a control of the kind described, a thermal unit subject to extraneous heat that may cause improper operation thereof, a load adapted to operate upon a certain predetermined amount of current to produce a given effect, a pair of heaters, means connecting the heaters in series with the load, means operated by the thermal unit to shunt one heater, the relative resistances of the heaters and load being such that when both heaters are thus in series they generate a quantity of heat to prevent such improper operation, and their total resistance being such as to prevent passage of enough current to operate the load to produce said effect, and their relative values being such that when the one heater is shunted the heat generated is still enough to prevent such improper operation, and the value of the resistance not shunted being such as to permit passage of enough current to cause operation of the load to produce said effect.

12. In a cooling system, a thermostat and a switch, a power supply, a pair of heaters adjacent the thermostat and connected in series across the power supply, said switch being connected in parallel with one heater and in series with the other, said heaters producing heat to compensate for external cold on the thermostat, a cooling means, means to cause the cooling means to be operated, and a control element for said means in series across the power supply with the switch and the one of the heaters with which the switch is in series.

13. In a system of the kind described, a heat-change producing means, a place the temperature of which is to be controlled by the heat-change producing means, a thermostatic means in said place, said thermostatic means being subjected to temperature changes at the place of two kinds, the first of which is produced by the heat-change producing means and is the kind to which it is desired that the thermostatic means shall respond, and the second of which is the kind to which it is desired that the thermostatic means shall not respond, and means disposed in heat-transfer relationship with said thermostatic means for producing thereon a heat-change substantially equal and opposite to the second temperature change, whereby the thermostatic means may properly respond to temperature changes of the first kind.

LAWRENCE M. PERSONS.